(12) United States Patent
Elberbaum

(10) Patent No.: US 8,596,174 B2
(45) Date of Patent: Dec. 3, 2013

(54) HAND TOOL AND METHOD FOR CUTTING PLASTIC FIBER OPTIC CABLE WITHOUT ERROR

(71) Applicant: Elbex Video Ltd., Tokyo (JP)

(72) Inventor: David Elberbaum, Tokyo (JP)

(73) Assignee: Elbex Video Ltd., Tokyo (JP)

( * ) Notice: Subject to any disclaimer, the term of this patent is extended or adjusted under 35 U.S.C. 154(b) by 0 days.

(21) Appl. No.: 13/855,882

(22) Filed: Apr. 3, 2013

(65) Prior Publication Data

US 2013/0228055 A1 Sep. 5, 2013

Related U.S. Application Data

(62) Division of application No. 13/178,697, filed on Jul. 8, 2011, now Pat. No. 8,453,332.

(51) Int. Cl.
*B21F 13/00* (2006.01)
*G02B 6/25* (2006.01)

(52) U.S. Cl.
USPC .................................. 83/13; 30/90.1; 30/278

(58) Field of Classification Search
USPC ........ 83/13; 30/90.1, 91.2, 132, 278; 81/9.44, 81/9.42, 9.43
See application file for complete search history.

(56) References Cited

U.S. PATENT DOCUMENTS

| 241,534 | A | 5/1881 | Glazier |
| 3,254,407 | A | 6/1966 | Apa et al. |
| 4,261,102 | A | 4/1981 | Andriotis |
| 4,835,862 | A | 6/1989 | Phillips |
| 5,046,252 | A | 9/1991 | Ayuta et al. |
| 5,325,587 | A | 7/1994 | Steiner et al. |
| 6,058,606 | A | 5/2000 | Hepworth |
| 6,505,399 | B2 | 1/2003 | Lo et al. |
| 6,636,672 | B1 | 10/2003 | Blyler, Jr. et al. |
| 6,701,055 | B2 | 3/2004 | Yasuda |
| 2010/0187276 | A1 | 7/2010 | Ohmura et al. |
| 2011/0126414 | A1 | 6/2011 | Mulligan et al. |

FOREIGN PATENT DOCUMENTS

| WO | 2009/105770 | 8/2009 |
| WO | WO-2009105770 | * 8/2009 |

OTHER PUBLICATIONS

International Search Report and Written Opinion of the International Searching Authority dated Feb. 1, 2013, from corresponding International Application No. PCT/US2012/044119.

* cited by examiner

*Primary Examiner* — Stephen Choi
(74) *Attorney, Agent, or Firm* — Katten Muchin Rosenman LLP

(57) ABSTRACT

Method and apparatus for cutting and terminating POF cable with error prevention. The apparatus comprises a hand tool with a blade supporting top bar linked to a bottom bar. The bottom bar comprises two aligned rows of holes perpendicular to the blade and opposite each other with a space between the rows for providing the blade the movement space needed for the cutting and terminating POF cable when at least one of the top bar and the bottom bar is pressed against the other.

6 Claims, 4 Drawing Sheets

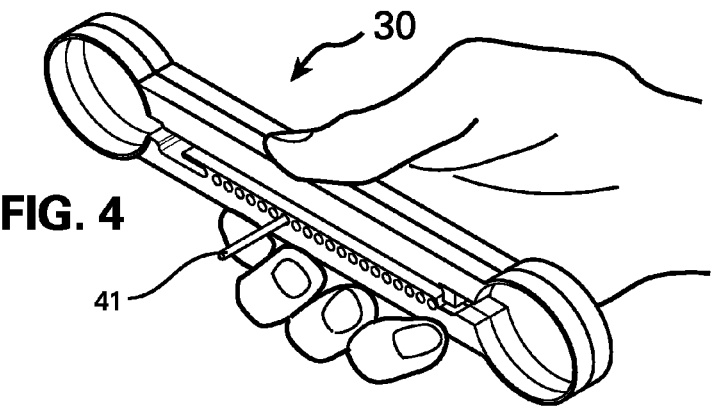
FIG. 4
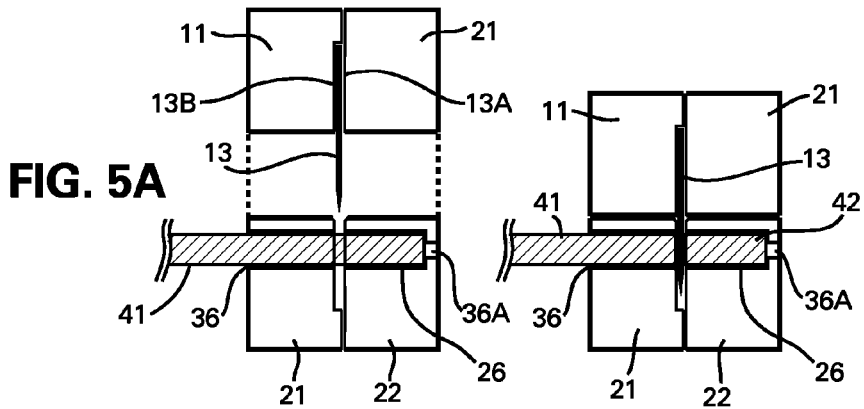
FIG. 5A  FIG. 5B
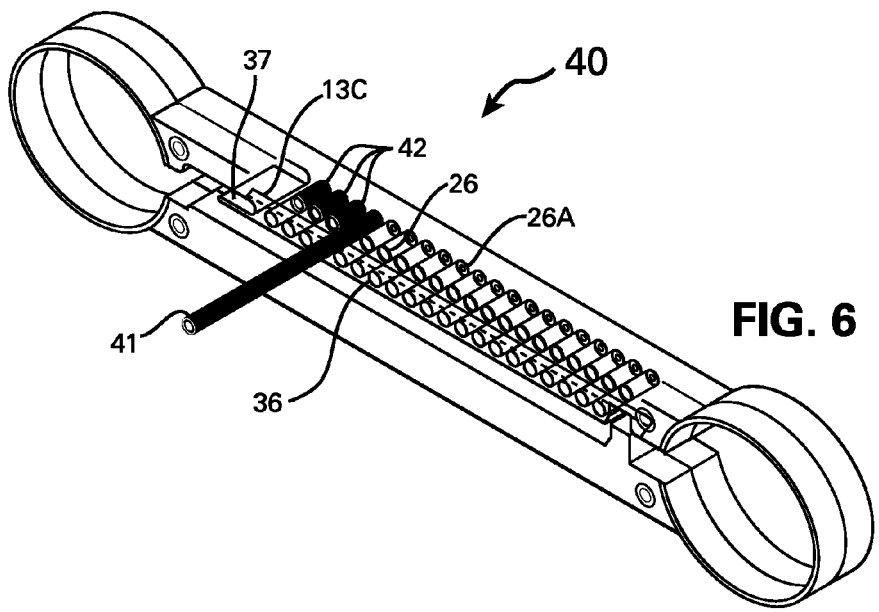
FIG. 6

HAND TOOL AND METHOD FOR CUTTING PLASTIC FIBER OPTIC CABLE WITHOUT ERROR

BACKGROUND OF THE INVENTION

This invention is related to a disposable hand tool for cutting plastic optical fiber cable known as POF and to an hand tool with disposable cutting blade.

DESCRIPTION OF THE PRIOR ART

There are not too many hand held cutting tools made for POF, mostly are small "in palm" sized plastic molded tool, including a thin blade or a razor in a range of 0.2~0.5 mm thick, comprising row of holes that fit the thickness of a commonly used single POF cable (such as 2.2 mm diameter) or of a commonly used twin core POF cable with each of the twin cable diameter is 2.2 mm. The cutters are all operating in a guillotine style wherein the POF cable is inserted into one of a single hole or twin holes and the blade or the razor is pushed toward the cable to cut it perpendicular to the cable length, providing smooth cut surface.

To provide smooth cut without scratches, cracks or other deformed surfaces the blade's edge should be used only once per cut. This was proven time and again that the edge is damaged by the cut and when the blade's sharp edge is used more than once, the cuttings become unreliable. The repeated use of the sharp edge by cutting the POF through the same given hole is a cause for scratches, cracks and uneven surfaces of the core itself, moreover it creates residues of hanging whiskers of the core's cladding and of the cable protective cover, some of which may adhere onto the cut surface plane of the core. The optical characteristics and the performances of the plastic optical fiber (POF) cable are severely affected by the defects caused by the repeated use of the blade's edge and such repeated cuttings should be prevented.

Literally all of the known disposable hand cutting tool provide only instruction and warning not to use the same hole twice, but do nothing to prevent a repeated cutting through the same hole. The warning is a failed solution, because users genuinely forget which of the holes is already used and unintentionally re-use the same hole.

Some are searching for a solution and an hand tool for cutting POF by a blade with a mechanism for preventing repeated cutting by the same sharp edge portion is disclosed in US application 2010/0187276 dated Jul. 29, 2010. However the disclosed hand tool introduces complex mechanism for such simple cutting operation. The disclosed hand tool of the application 2010/0187276 is a complex structure and a cumbersome to configure and operate. Moreover, such hand tool if it will become available it will be too expensive for a disposable type, and a simpler far less complex and far less costly solution is needed.

SUMMARY OF THE INVENTION

It is the object of the present invention to provide a disposable hand tool or a disposable blade or a razor, for example, such as used by the well known NT cutter which is a world known disposable blade and which is the preferred blade for the hand tool of the present invention. The NT cutter blade and the preferred blade thickness of the present invention is 0.25 mm or $\frac{1}{100}$", but blades with thickness of 0.1 mm~0.8 mm can be adequately used, and be sharpened with different angles of the their sharpened edge.

The hand tool of the preferred embodiment is structured to include only two injected plastic body parts, one is termed the blade holder and the other is the cover. Both the blade holder and the cover provide a row of holes for a given specific diameter, accommodating the POF cables the hand tool is designed to cut. As shown in the illustration of FIGS. 1A~7B and explained in the detailed description of the preferred embodiment, the concept of preventing a repeat cutting by the same portion of the sharp edge of the blade, or via the same hole is achieved by the blocking of the hole with the residue cut that remains in the hole and thus prevent a repeated use of the same hole or the same portion or position of the sharp edge of the blade.

The two parts of the hand held cutter, the blade holder and the cover, can be structure for assembly without any facility for separating them to render the hand tool a disposable type. Once all the holes were used for cutting the POF, the tool cannot be re-used anymore and will be disposed of.

On the other hand the cover for example can be provided with locking hooks, screws or other fasteners that can be released, such that it will provide for the disassembling of the hand tool, the removal of the used blade, the release of the residue cuts and the re-assembling of the hand tool for re-use with a new (non used) replacement blade.

The present invention further provides for a portion of the blade to be used for repeated cuts via an open ended access. This open ended access is used for cutting the POF to a given length that currently is cut by other cutting tools, such as a common cutter, nipper or heavy scissors. This is because it is not practical, for example, to cut from a spool of POF cable a 10 meter long piece by sliding or feeding the 10 meter long POF through a cutting hole of the hand held cutter.

The users therefore will use knives or scissors or wire cutters to cut the basic length of a POF piece. Such cuts are deforming the shape of the cut end and making the POF end not fit for the intended final cut through the hand tool that provides smooth cut surface with no defects as explained above. Thus the initial cut pieces of a POF spool can be repeatedly cut by the same edge portion of the blade through the open ended access, specifically allotted for such repeated cuts. And even though the surfaces of the initial cut pieces may be scratched or otherwise damaged the cut ends are not deformed. By the cut through the open access the POF will be fit for final surface cutting via the hand tool of the present invention, which ensures no surface's defects and no error in cutting position, limiting the surface's cut through the unused holes of the hand tool of the present invention.

BRIEF DESCRIPTION ON THE DRAWINGS

The foregoing and other objects and features of the present invention will become apparent from the following description of the preferred embodiments of the invention with reference to the accompanying drawings, in which:

FIG. 4 is an illustrative view of the cutting hand tool of the preferred embodiment of the present invention being hand pressed for cutting a POF cable.

FIGS. 5A and 5B are sectional views of the cutting hand tool in its ready state for cutting and in a pressed cut state.

FIG. 6 is a perspective view of the cutting hand tool structured in a transparent plastic material of the preferred embodiment of the present invention.

DETAILED DESCRIPTION OF THE PREFERRED EMBODIMENTS

Figure 1A:
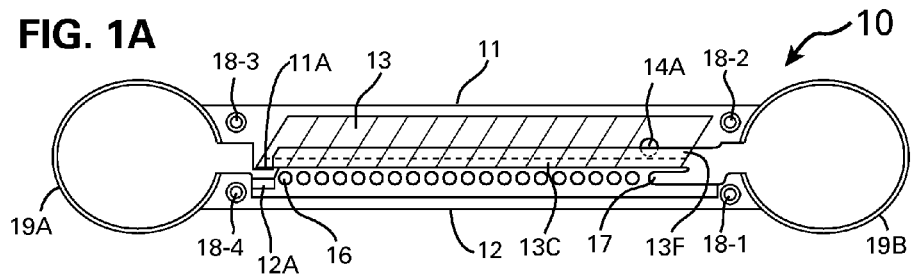
FIG. 1A is the inner view drawing showing the surface of the blade holder with the blade of the preferred embodiment of the present invention.

Shown in FIG. 1A is the surface of the blade holder 10 including the blade 13. The shown blade is the well known ND cutter blade, that is available in different thicknesses and steel hardnesses. The well known blade includes a hole 13D shown in FIG. 2 that is commonly used by the well known NT cutting knife (not shown). Similar cutting knifes and blades are available by many manufacturers.

The selected blade for the preferred embodiment is the standard NT blade made of hard steel and having thickness of 0.25 mm or 1/100". However, many different blade shapes, size or thicknesses can be used by simply modifying the blade holding shown in FIG. 2. The blade 13 holding recess area 13B including the half circle pin 14, fit precisely the preferred NT cutter and its hole 13D for enabling a precise insertion of the blade into its place. For other shape, type and sizes blade the recessed area shown as 13B should be designed to fit a given selected blade.

The blade holder 10 comprises four parts, all molded together into one piece 10. The four parts can be termed as top bar or blade holder 11, the bottom bar or cable insertion bar 12 and two springy rings 19A and 19B that hold the top bar 11 and bottom bar 12 apart, yet providing by their flexibility to press the bars all the way till they touch each other.

The top bar includes a protruding structure 11A that serves two purposes, one is to hold the edge 13E of the blade in place and the other is to act as a structured guide for the up down press action, by sliding through the receptive cutout 12A. The structured guide 11A and the cutout 12A together ensure no horizontal shifting position when the two bars 11 and 12 are pressed all the way until they touch each other, or during the POF cutting that is explained later.

The bottom bar or the cable insertion bar 12 further includes a row of circular holes 16 with each of the shown holes has a diameter to fit the POF cable that the hand tool is designed to cut. The diameter of the popular size POF is 2.2 mm, but any circular cable diameter or non circular shapes can be provided by row of holes made to fit precisely the POF cable size and shape. The reference to POF is to an optical cable known as Plastic Fiber Optic. The POF plastic core PMMA is softer to cut in comparison with the silica or a glass base core of the known fiber optic cables and while the silica core must be polished and lapped, the POF need no further treatment if it is cut cleanly without scratches and or other deformation of its cut surface. For this reason the cutting hand tool of the POF of the present invention can be viewed as a cutting and/or termination tool for POF cables. This is why the cutting should not be permitted to repeat through the same hole 16.

Even though it may be possible, for example, to cut several times the POF via the same hole with no scratches, there are no means to verify how many cuts can be made without damaging the sharp edge 13C of the blade in a given position.

This is why it is necessary to limit the cut to only one per hole. The open ended access 17 is provided for cutting long pieces of POF cable 40, for example when it is cut from a spool 49 shown in FIG. 3A. As shown the blade section 13F is the blade position allocated to cut the POF cables inserted into the open access hole 17.

Figure 1B:
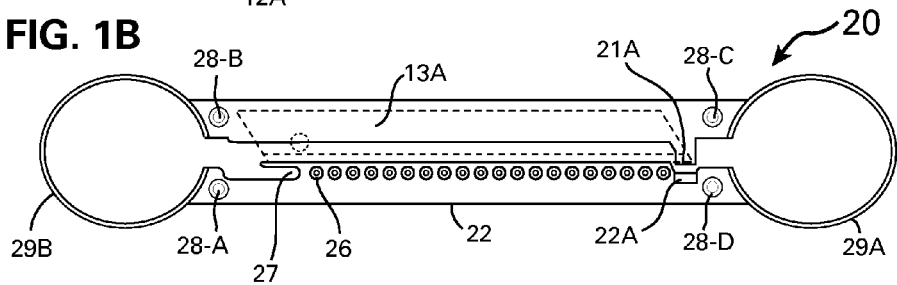
FIG. 1B is the inner view drawing showing the surface of the cover of the preferred embodiment of the hand tool of the present invention.
Figure 2:
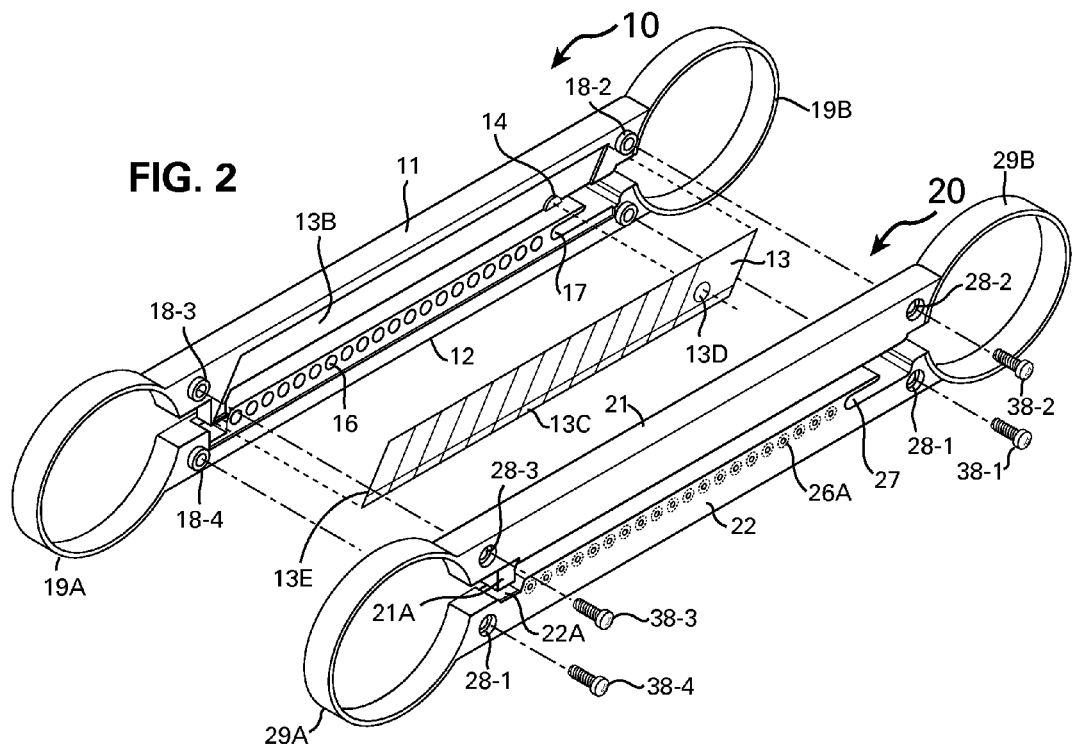
FIG. 2 is an exploded view of the hand tool of the present invention including the blade.
Figure 3A:
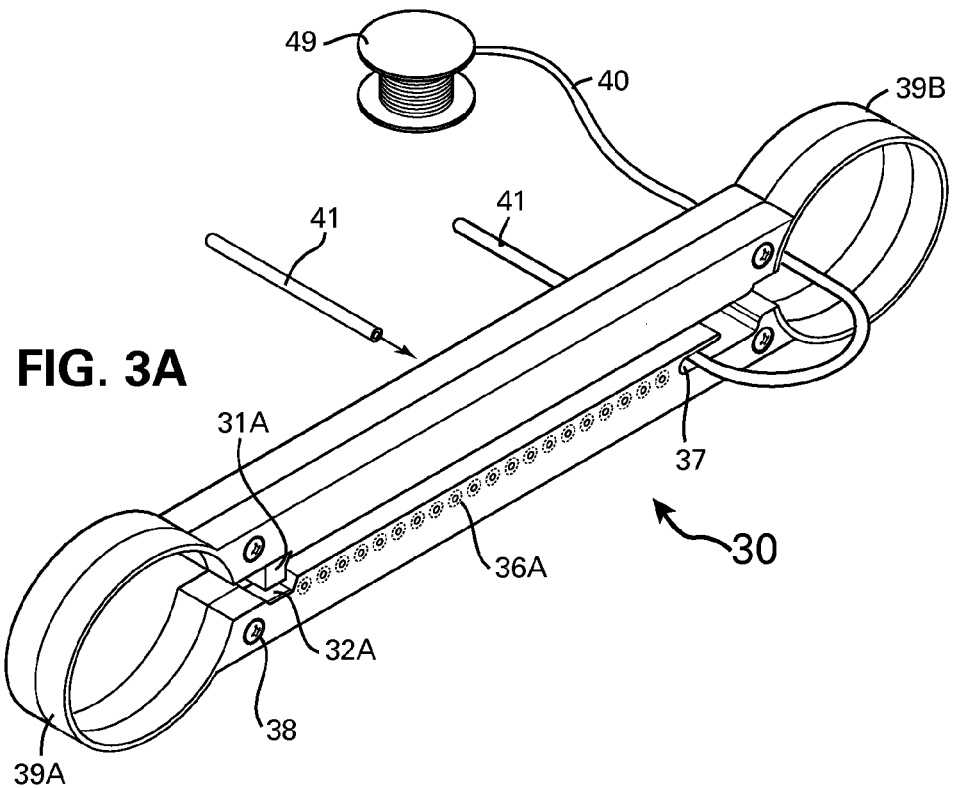
FIG. 3A is a perspective view of the cutting hand tool of the present invention from its cover side.
Figure 3B:
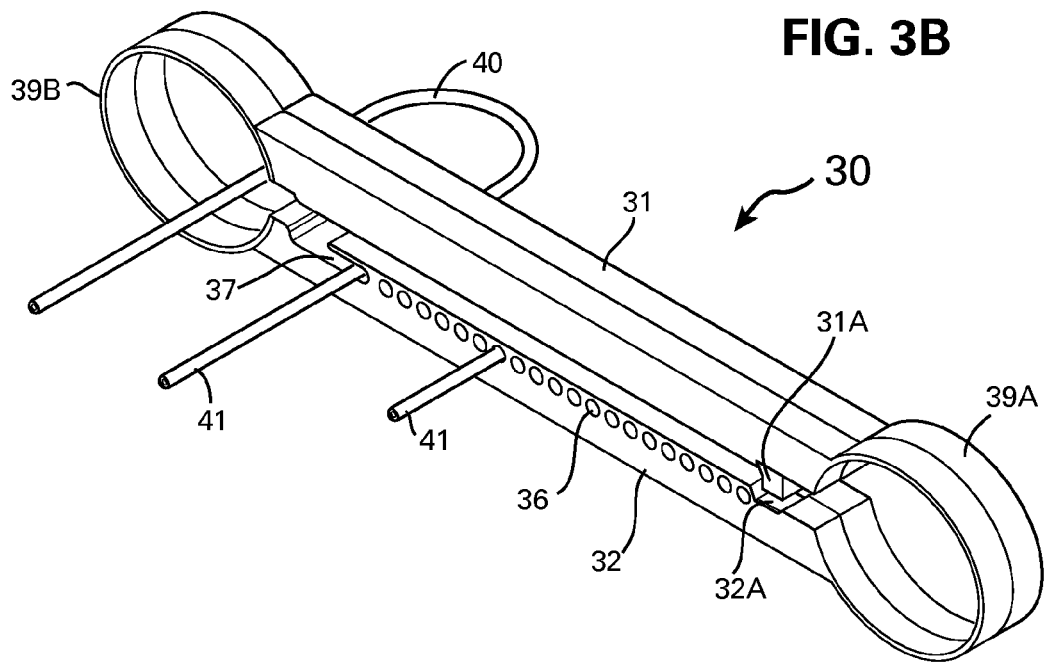
FIG. 3B is a perspective view of the cutting hand tool of the present invention from its blade holder side.

The four studs 18-1 to 18-4 are protruding to fit the four corresponding recesses 28-A to 28-D of the cover 20 shown in FIG. 1B, for ensuring precise match when the blade holder 10 and the cover 20 are assembled as shown FIGS. 2, 3A and 3B.

FIG. 1B shows inner surface of the cover 20 comprising, similar to the blade holder 10, four parts, the top bar 21, the bottom bar or the residue cut pieces retainer 22 and the two springy rings 29A and 29B. The mechanical outer shape and sizes are identical, excluding the protruding studs 18 and recesses 28, the guide 11A and the receptive cutout 12A which are located in the opposite side and numbered 21A and 22A respectively. The other differences between the blade holder 10 and the cover 20 as shown also in FIG. 2 is that the holder area for the blade is a recessed area 13B, while the corresponding surface 13A of the cover is flat, made to press and fasten the blade 13 into the recessed area 13B. However, the blade 13, the recess 13B and the flat surface of the cover 20 for fastening the blade can be for example split, such as half depth of the recess 13B can be structured in both the blade holder 10 and the cover 20.

It should be noted that though the springy rings are shown as molded parts connecting the two bars as a combination single part, this relates only to one preferred embodiment. The single part blade holder and/or the single part cover can be constructed of metal cast individual parts, or machined parts including such parts as spring and guides instead of the shown springy rings 19 or 29. Same applies to the top and bottom bars, they can be fabricated, or die casted, or made of plastic material and individually injected. Further the spring action described here is not necessary for the error free cutting process. The spring action is improving upon the performance of the hand tool, making it more convenient to use but the hand tool can operate by manual movement up-down with no springs or springy movements.

The most significant other difference is the structure of the holes 26 which provide for retaining the residue cuts 42 of the terminated end of the POF cables 41 shown in FIGS. 5B and 6. The residue cut 42 remaining inside the hole 26 shown in FIG. 5B blocks the repeat use of a given hole 36 as shown in FIG. 6.

The shown hole 26 is the inner hole of the cover 20. The outer side for the cover 20 in FIG. 2 shows a far smaller hole 26A, which only provides for release of air during the insertion of the POF cable 41 and/or for releasing the residue cut 42 by thin pins, but only in a re-usable cutting hand held tool as will be explained later.

FIG. 2 illustrates the assembly of the blade holder 10 and the cover 20 including the blade 13 into a cutting hand tool 30, 40, 50 or 60 shown in FIGS. 3, 4, 5, 6 and 7. The shown four screws 38-1~38-4 are one example of fastening possibilities, be it using fasteners such as the shown screws or rivets, and/or using molded hooks that are part of the blade holder or the cover or both, or are separate locking devices such as springs and latches or such as assembling and attaching the two parts by bonding. Another method for example, is to heat seal the blade holder 10 with the cover 20 and with the blade 13 installed into its recessed supporting area 13B. The protruding studs 18-1 to 18-4 are fit to match the recesses 28A to 28D (not shown in FIG. 2, but are shown in FIG. 1B), for precise positioning of the cover 20 against the blade holder 10.

Therefore the attaching of the two, the blade holder 10 and the cover 20 including the blade 13 using the screws 38-1 to 38-4 or any other fasteners or fastening methods, including the methods discussed above will result in a cutting hand tool shown in FIGS. 3A, 3B, 4, 5A, 5B, 6, 7A and 7B.

The cutting hand tool 30 in FIG. 3A shown from the cover side shows the cutting of the POF 40, taken from a spool 49 by inserting the length of the needed cut piece 41 through the open ended access 37 and be cut by the blade portion 13F shown in FIG. 1A. Such cut will not be deforming the end cut of the POF 41 that can be promptly re-inserted into an unused hole 36 for re-cut or for terminating the cable end, as explained above, to clean cut the cable end by a non used blade portion.

The numeric showing the combined open ended access is 37, the numeric for retaining rear end holes are shown as 36A, the combined guides 11A and 21A are shown as 31A, the corresponding receptive cutouts 12A and 22A are shown as 32A and the combined springy rings are shown as 39A and 39B.

FIG. 3B shows the same assembled cutting hand tool 30 from the blade holder side. The cutting hand tool 30 of FIG. 3B is identical and is shown cutting the POF cable 40 via the open ended access 37 and terminating the cut piece 41 through the unused hole 36. FIG. 4 illustrates the simplicity of operating the cutting hand tool 30 by pressing the two bars the top 31 and the bottom 32 shown in FIG. 3B for terminating the inserted end of the POF 41, shown inserted into an unused hole 36.

FIG. 5A shows the sectional view of the cutting hand held tool 30 in non depressed state wherein the bar 11 holds the blade 13 inside the recessed area 13B and locked into position by the bar 21, using the screws 28-1 to 28-4 shown in FIG. 2, or other fasteners. The POF cut piece 41 is shown inserted into the hole 36 all the way into the end of the hole 26 (of FIG. 1B). The very small hole 36A provide for the release of air pressure build-up against the insertion of the POF into the tight end of the hole 26. The small hole 36A can also be used for releasing or removing the residue cut piece 42 when the blade holder 10 and the cover 20 of a re-usable cutting hand tool 30, 40, 50 or 60 are separated, by inserting a pin through the hole 36A and applying force to push out the residue cut 42 shown in FIGS. 5B and 6.

FIG. 5B shows the upper bar 31, combining the upper bars 11 and 21, depressed onto the lower bar 32, combing the lower bars 12 and 22, and cutting in the process the POF cable 41 by the blade 13. The residue piece 42 is left inside the hole 26 while the terminated piece 41 can be simply pulled back and removed. The residue cut piece 42 blocking the hole 26 is preventing a repeat use of the same hole 36.

Even in the event that a user is trying to force the POF piece 41 into the blocked hole 26 through the insert hole 36 the blade will push the inserted POF cable 41 back by acting as a thin divider between the retained residue cut 42 and the newly inserted POF cable 41. In the extreme when the user strongly pushes inwards the POF cable 41 and tries to cut it the blade may chip or otherwise damage the inserted cable 41 end, such that it will be obvious and recognizable to the user that he has inserted the POF piece 41 into a used hole.

FIG. 6 shows the cutting hand tool 40 made of a transparent clear plastic material for providing unmistakable inside view of the cutting hand tool 40, including the viewing of the cutting process by the blade 13, and of course the view of the used holes, or the viewing of the residue cuts 42 retained inside the holes 26. The shown cutting hand tool 40 includes three retained residue cuts 42 and is also showing the cutting or terminating process of a newly inserted POF cable piece 41. The transparent cutting hand tool 40 is therefore very informative and useful and is another preferred embodiment of the cutting hand tool of the present invention.

The shown transparent hand tool 40 is identical to the structure shown for the hand tool 30, however when different structures are adopted (not shown) for cutting hand tools, such as the top bar 31 and the bottom bar 32 are molded or otherwise individually constructed, for example with a spring and guide attaching the bars together, it is preferable to construct at least the bottom bar of such tool, comprising the inserting and the retaining holes in a transparent clear material for improving the viewing of the retained residue cuts and the cutting or the terminating process, thereby improving upon the error prevention during the working of the tool.

For a cutting hand tool 30 in which its blade holder 10 and cover 20 are attached together by fasteners such as rivets, or attached by bond, or by other processes that prevent the disassembly of the hand tool, the cutting hand tool 30 becomes disposable, to be discarded after using all of its holes for cutting and terminating POF cables.

Users that intentionally try to misuse the disposable hand tool by attempts to remove the residue cuts 42 from their respective hole 26, using a pushing pin to force the cut 42 back through the hole 36 will fail. The hole 36 is sized to be precisely fit the size (diameter) of the POF cable. On the other hand the retaining hole 26 is structured to be very tight at its rear end, closer to the hole 36A and slightly loose at its entry 26. This serves two purposes, one is to hold firmly the retained cut piece 42 inside the hole 26 and the other is to make it extremely unlikely that the pushing back of the cut piece 42 will be in a "perfect" position to enter the tight size hole 36. After few attempts any one will give up the imaginary re-use of a low cost disposable cutting hand tool 30 or 40.

The cutting hand tool 30 shown assembled in FIG. 2 by the shown screws 38-1~38-4 or by other fasteners (not shown) that provide for disassembling of the blade holder 10 and the cover 20 becomes a re-usable cutting hand tool 30, 40, 50 or 60. Re-usable cutting hand tool further provides for removing the used blade 13 and replacing it with a new blade. It also enables the user to push out the retained residue cuts 42 by a thin pin through the holes 36A that pushes the cuts 42 out from the holes 26 when the cover 20 is removed. Thereby clearing all the holes 26 for re-use along with a newly replaced blade 13, by a re-assembled hand tool 30, 40, 50 or 60.

Figure 7A:
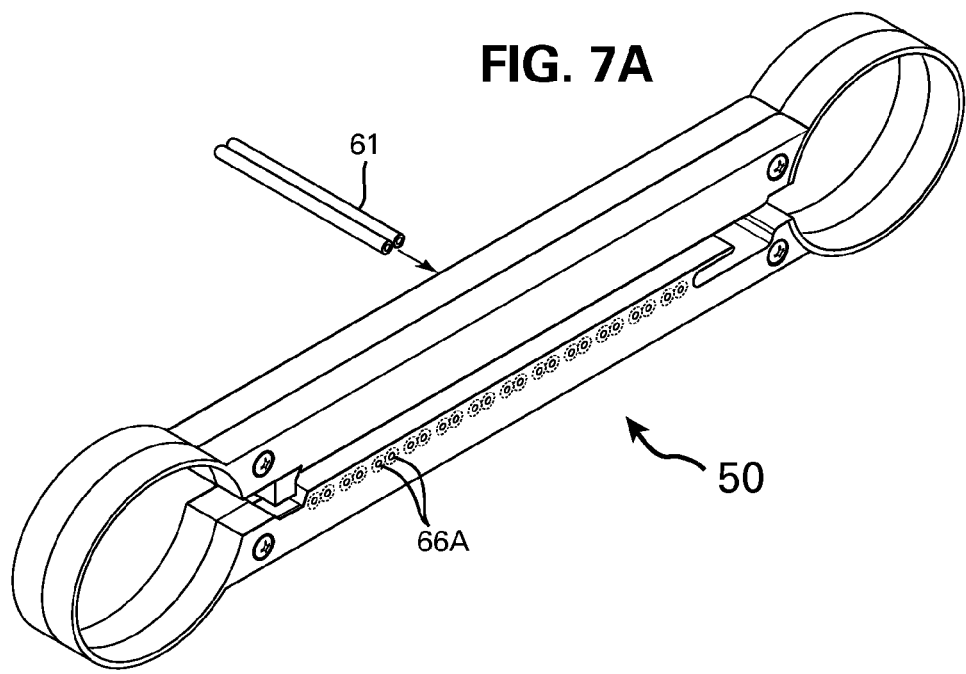
FIGS. 7A and 7B are perspective views of the cutting hand tool for twin core POF cable and a mix cutting tool for a single POF and twin POF cables.
Figure 7B:
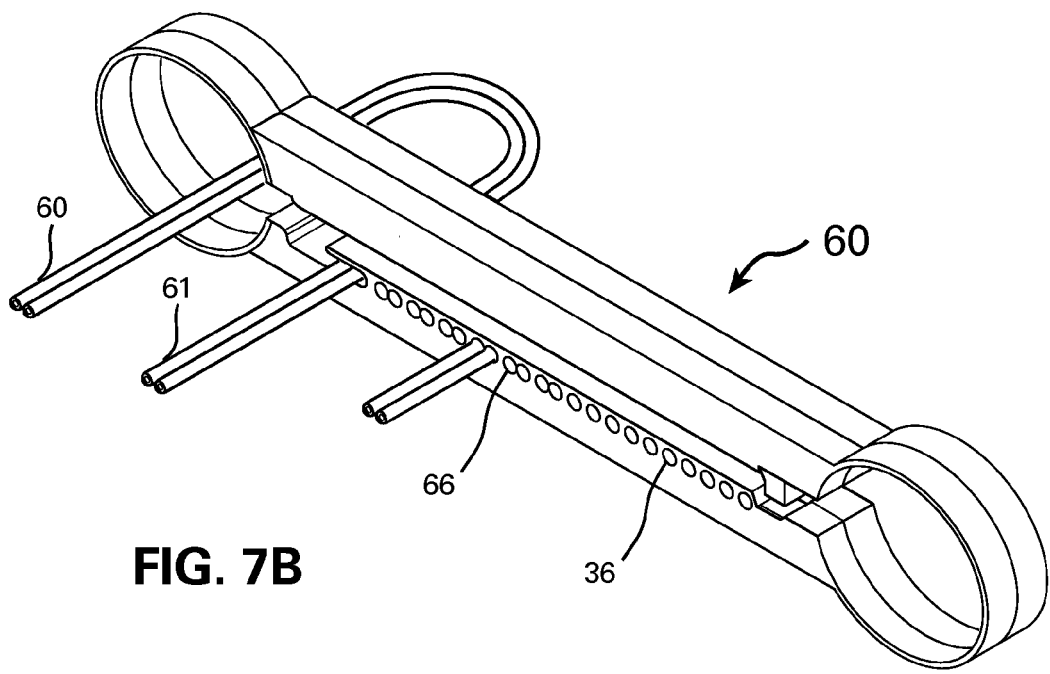

FIGS. 7A and 7B show the cutting hand tool 50 and 60 wherein the hand tool 50 is shown to cut or terminate a twin POF cable 61, for which the holes 36 shown in the hand tool 30 are replaced by twin holes 66, shown in FIG. 7B, including the twin holes 66A replacing the holes 36A of the hand tool 30. The cutting hand tool 60 shown in FIG. 7B is a combination tool for cutting or termination single POF cable 40 or 41 and twin POF cable 60 or 61.

All other explanations and details referred to above in connection with the hand tool and the method for cutting plastic optical fiber cable without error applies to the cutting hand tools 50 and 60. Further the POF cable can be manufactured in a ribbon structures combining more than just two cores, shown as the POF cable 60. For such ribbon cables with, for example three or more cores, the insert holes 36 or 66 and the retaining holes 26, with the push back holes 36A or 66A can be redesigned and structured to accommodate such ribbons, this includes a universal cutting hand tool (not shown) made by combining different insert holes and retaining holes in different shapes, diameters, and combinations thereof, and not limited to a specific size cable as shown above for the cutting hand tool 30, 40, 50 or 60.

It should be understood, of course, that the foregoing disclosure relates to only a preferred embodiment of the invention and that it is intended to cover all changes and modifications of the example of the invention herein chosen for the purpose of the disclosure, which modifications do not constitute departures from the spirit and scope of the invention.

What is claimed is:

1. A method for cutting and terminating POF cable without error by a guillotine hand tool comprising a blade supporting top bar linked by an up-down structures to a bottom bar, said bottom bar comprising two aligned rows of holes perpendicular to said blade and opposite to each other with a space between said rows for providing said blade the movement space needed for said cutting and terminating POF cable, each of said holes of one of said rows is an inserting hole used for inserting an end of said POF cable all the way through into a corresponding retaining hole of the other row for retaining a residue of a terminated end of said POF cable when said POF cable is one of cut and terminated, said method comprising the steps of:
   a. inserting an end of said POF cable all the way through one of said inserting holes into said corresponding retaining hole;
   b. pressing at least one of said top bar and said bottom bar against the other for one of said cutting and terminating said POF cable;
   c. removing said cut or terminated cable end from said inserting hole;
   d. retaining the retained cut inside said retaining hole for preventing the reuse of said inserting hole for a repeat terminate of said POF cable through the same inserting hole.

2. A method for cutting and terminating POF cable according to claim 1, wherein at least one of said hand tool and said bottom bar is made of a transparent material for enabling inside view of at least one of said cutting and said retaining holes for improving upon said error prevention.

3. A method for cutting and terminating POF cable according to claim 1, wherein each of said two rows of holes of said bottom bar includes an open ended cutting access aligned with each other for providing free random insertion of said POF cable along the cable run for non limited random cutting.

4. A method for cutting and terminating POF cable according to claim 1, wherein said two links connecting said top bar and said bottom bar include a springy structure for keeping said top bar separated from said bottom bar and said blade from obstructing said holes.

5. A method for cutting and terminating POF cable according to claim 1, wherein said hand tool is a disposable tool with no facilities for at least one of removing said retained cuts retained in said retaining holes and replacing said blade.

6. A method for cutting and terminating POF cable according to claim 1, wherein said hand tool is a reusable tool by a disassembly of said hand tool for removing said retained cuts retained in said retaining holes and for replacing said blade.

* * * * *